(12) United States Patent
Grueger et al.

(10) Patent No.: US 8,351,032 B2
(45) Date of Patent: Jan. 8, 2013

(54) RADIATION GENERATION DEVICE FOR GENERATING ELECTROMAGNETIC RADIATION HAVING AN ADJUSTABLE SPECTRAL COMPOSITION, AND METHOD OF PRODUCING SAME

(75) Inventors: Heinrich Grueger, Dresden (DE); Jens Knobbe, Dresden (DE); Thomas Egloff, Schwarza (DE); Michael Mueller, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 205 days.

(21) Appl. No.: 12/947,612

(22) Filed: Nov. 16, 2010

(65) Prior Publication Data

US 2011/0128541 A1 Jun. 2, 2011

(30) Foreign Application Priority Data

Nov. 18, 2009 (DE) .................... 10 2009 046 831

(51) Int. Cl.
*G01J 3/28* (2006.01)
(52) U.S. Cl. ........................... 356/326; 356/328
(58) Field of Classification Search ................ None
See application file for complete search history.

(56) References Cited

U.S. PATENT DOCUMENTS 6,404,492 B1 * 6/2002 Xu et al. ............... 356/326
7,092,594 B2 * 8/2006 Yamamoto et al. ............. 385/24

FOREIGN PATENT DOCUMENTS

| DE | 102004008685 | 9/2005 |
| DE | 69635620 T2 | 8/2006 |
| EP | 0867697 B1 | 12/2005 |
| WO | WO2005/080946 A2 | 9/2005 |

* cited by examiner

*Primary Examiner* — Gregory J Toatley
*Assistant Examiner* — Shawn Decenzo
(74) *Attorney, Agent, or Firm* — Michael A. Glenn; Glenn Patent Group

(57) ABSTRACT

A radiation generation device for generating resulting electromagnetic radiation having an adjustable spectral composition includes: a multitude of radiation elements (configured to generate a radiation element specific electromagnetic radiation, respectively, upon being activated, a first radiation element of the multitude of radiation elements being activatable independently of a second radiation element of the multitude of radiation elements; a dispersive optical element; and an optical opening; the dispersive optical element being configured to deflect the radiation element specific electromagnetic radiations, in dependence on their wavelength and on a position of the radiation element generating the respective radiation element specific electromagnetic radiation, such that a particular spectral range of each of the radiation element specific electromagnetic radiations may exit through the optical opening, so that the spectral composition of the resulting electromagnetic radiation exiting through the optical opening is adjustable by selectively activating the multitude of radiation elements.

24 Claims, 6 Drawing Sheets

RADIATION GENERATION DEVICE FOR GENERATING ELECTROMAGNETIC RADIATION HAVING AN ADJUSTABLE SPECTRAL COMPOSITION, AND METHOD OF PRODUCING SAME

CROSS-REFERENCE TO RELATED APPLICATIONS

This application claims priority from German Patent Application No. 102009046831.5, which was filed on Nov. 18, 2009, and is incorporated herein in its entirety by reference.

The present invention relates to devices for generating electromagnetic radiation having adjustable spectral composition.

BACKGROUND OF THE INVENTION

In optical spectral analysis, the composition, the condition or other properties of the object to be examined are examined by means of the interaction of electromagnetic radiation with the surface and at the volume of said object. In this context, the wavelength-dependent reflection, transmission, absorption and scattering properties of materials are exploited.

Various variants of arrangements for performing spectroanalytical examinations have been known.

A first variant illuminates the sample with the entire polychrome spectrum of a light source, for example a halogen lamp or a thermal radiator. The light that has started to interact with the sample is then broken up into its spectral constituents within a monochromator, and detected by means of a radiation detector or photodetector. To this end, what may be used is either a mechanically movable dispersive element (grating, prism) or an arrangement of several radiation detectors. What is disadvantageous in the first possibility is utilization of a movable element, which results in increased overhead for the overall system. On the other hand, use of an arrangement of several detectors entails a relatively large amount of effort and is relatively expensive, particularly in the infrared wavelength range. In addition, due to the high optical power, the sample is heated and, thus, the measurement is influenced. A further disadvantage is the limited miniaturizability of the overall system. It is restricted, among other things, by the sizes of the radiation sources.

In a second variant, the light of a light source is broken up into its spectral constituents before starting to interact with the sample. For this purpose, a monochromator may be used as well, which, in turn, contains mechanically movable parts. Following the interaction with the sample, the light is detected using an individual detector. The sample is exposed to a comparatively small radiation intensity. The architecture is comparatively costly and mechanically delicate. In addition, in this case, too, the radiation source restricts the miniaturization of the overall system on the basis of system integration.

In a third variant, the electromagnetic radiation is generated within a very small spectral range only. For this method, one predominately uses such lasers whose wavelengths may be changed by tunable resonators are predominately used. What is advantageous is the high intensity within a very small wavelength interval. What is disadvantageous is the limitation to specific wavelength ranges with corresponding laser activity, increased effort devoted to the system due to the high levels of mounting accuracy, and the high price resulting therefrom. In addition, mechanically movable elements, such as gratings, are sometimes used, which entails sensitivity toward mechanical environmental influences. Also, when irradiating rough surfaces, the high spatial coherence leads to interference effects, so-called speckles, which may result in measurement errors in the detection.

In a fourth variant for a wide-range near-infrared spectral analysis, an electron cyclotron (storage ring) may be used, for example, which due to its size cannot be configured to be portable.

SUMMARY

According to an embodiment, a radiation generation device for generating resulting electromagnetic radiation having an adjustable spectral composition may have: a multitude of radiation elements configured to generate a radiation element specific electromagnetic radiation, respectively, upon being activated, a first radiation element of the multitude of radiation elements being activatable independently of a second radiation element of the multitude of radiation elements; a dispersive optical element; and an optical opening; the dispersive optical element being configured to deflect each radiation element specific electromagnetic radiation, in dependence on its wavelength and on a position of the radiation element generating the respective radiation element specific electromagnetic radiation, such that a particular spectral range of each of the radiation element specific electromagnetic radiations may exit through the optical opening, so that the spectral composition of the resulting electromagnetic radiation exiting through the optical opening is adjustable by selectively activating the multitude of radiation elements.

According to another embodiment, a spectral analysis device may have: a radiation generation device for generating resulting electromagnetic radiation having an adjustable spectral composition, which radiation generation device may have: a multitude of radiation elements configured to generate a radiation element specific electromagnetic radiation, respectively, upon being activated, a first radiation element of the multitude of radiation elements being activatable independently of a second radiation element of the multitude of radiation elements; a dispersive optical element; and an optical opening; the dispersive optical element being configured to deflect each radiation element specific electromagnetic radiation, in dependence on its wavelength and on a position of the radiation element generating the respective radiation element specific electromagnetic radiation, such that a particular spectral range of each of the radiation element specific electromagnetic radiations may exit through the optical opening, so that the spectral composition of the resulting electromagnetic radiation exiting through the optical opening is adjustable by selectively activating the multitude of radiation elements; a radiation detector configured to receive the resulting electromagnetic radiation or an electromagnetic radiation generated by means of the resulting electromagnetic radiation; and an evaluation unit configured to perform a spectral analysis on the basis of the received electromagnetic radiation.

According to another embodiment, a method of producing a radiation generation device may have the steps of: providing or generating a multitude of radiation elements configured to generate a radiation element specific electromagnetic radiation, respectively, upon being activated, a first radiation element of the multitude of radiation elements being activatable independently of a second radiation element of the multitude of radiation elements; providing or generating an optical opening; providing or generating a dispersive optical element, connecting the dispersive optical element to the multitude of radiation elements and to the optical opening, the dispersive optical element being arranged and configured, in relation to the multitude of radiation elements and the optical opening, to deflect the radiation element specific electromagnetic radiations in dependence on their wavelengths and on a position of the radiation element generating the respective radiation element specific electromagnetic radiation such that a limited spectral range of each of the radiation element specific electromagnetic radiations may exit through the optical opening, so that the spectral composition of the resulting electromagnetic radiation exiting through the optical opening is adjustable by selectively activating the multitude of radiation elements.

One embodiment of the present invention provides a radiation generation device for generating resulting electromagnetic radiation having an adjustable spectral composition, comprising: a multitude of radiation elements configured to generate a radiation element specific electromagnetic radiation, respectively, upon being activated, a first radiation element of the multitude of radiation elements being activatable independently of a second radiation element of the multitude of radiation elements; a dispersive optical element; and an optical opening; the dispersive optical element being configured to deflect each radiation element specific electromagnetic radiation, in dependence on its wavelength and on a position of the radiation element generating the respective radiation element specific electromagnetic radiation, such that a limited spectral range of each of the radiation element specific electromagnetic radiations may exit through the optical opening, so that the spectral composition of the resulting electromagnetic radiation exiting through the optical opening is adjustable by selectively activating the multitude of radiation elements.

A further embodiment of the present invention provides a radiation generation device for generating resulting electromagnetic radiation having an adjustable spectral composition, comprising: a multitude of radiation elements configured to generate a radiation element specific electromagnetic radiation, respectively, upon being activated, each radiation element of the multitude of radiation elements being activatable independently of other radiation elements of the multitude of radiation elements; a dispersive optical element configured to split up each of the radiation element specific electromagnetic radiations into a multitude of spectral constituents, respectively; and an optical opening; the dispersive optical element and the optical opening being arranged and configured such that one of the spectral constituents of each radiation element specific electromagnetic radiation may pass through the optical opening, so that the spectral composition of the resulting electromagnetic radiation passing through the optical opening is adjustable by selectively activating the multitude of radiation elements.

The radiation elements may be configured to generate monochrome radiation element-specific electromagnetic radiations and/or polychrome radiation element specific electromagnetic radiations, it being possible for the polychrome radiation element specific electromagnetic radiations to be narrow-band or wide-band.

Embodiments of the radiation generation device may, therefore, comprise several monochrome light emitting diodes or laser diodes generating radiation element specific electromagnetic radiation of different wavelengths in each case, so that by selectively activating said radiation elements, a resulting electromagnetic radiation is generated which comprises one or more of said monochrome spectra.

Further embodiments may comprise thermal radiation elements, radiation elements in accordance with the halogen lamp principle or white light emitting diodes or other radiation elements configured to generate polychrome radiation element specific electromagnetic radiation. The dispersive optical element may be configured such that a particular or a limited spectral range of each of said radiation element specific electromagnetic radiations may exit through the optical opening, for example a spectral range smaller than the original spectral range generated by the radiation element, so that the resulting electromagnetic radiation comprises a spectral composition defined from one or more of the particular or limited spectral ranges.

In certain embodiments, the dispersive optical element and the optical opening may be configured such that of at least one or of each of said radiation element specific electromagnetic radiations, only a spectral range that is limited as compared to the original spectrum of the radiation element specific electromagnetic radiation may exit through the optical opening. In other words, such embodiments may be configured to filter the original radiation element specific electromagnetic radiation, it being possible, depending on the implementation of the optical dispersive element and the optical opening, for an original radiation element specific electromagnetic radiation to be filtered onto a narrow-band or, as seen in relation to the original spectrum, narrower-band spectrum or onto a monochrome spectrum. Such embodiments enable flexibly selecting, from the entire original wide-band or narrow-band spectrum of the polychrome radiation elements, particular spectral components, e.g. narrow-band, narrower-band or monochrome spectral constituents, and to select and/or superimpose them for generating the spectrum of the resulting electromagnetic radiation.

Further embodiments may comprise one or more polychrome radiation elements and, in addition, one or more monochrome radiation elements. In such embodiments, the dispersive optical element may further be configured such that of each of the polychrome radiation element specific electromagnetic radiations, a particular or limited spectral range may exit through the optical opening, for example a spectral range that is smaller than the original spectral range generated by the radiation element, and may further be configured to deflect the wavelength or the spectral range of each monochrome radiation element such that the monochrome radiation element specific electromagnetic radiation may exit through the optical opening. Such embodiments enable filtering out certain spectral components, e.g. narrow-band or monochrome spectral constituents, from wide-band polychrome radiation elements in a flexible manner, for example, and to superimpose them, for generating the resulting electromagnetic radiation spectrum, with monochrome radiation element specific electromagnetic radiations of the monochrome radiation sources, it being possible for the intensity of the monochrome radiation to be higher, for example, than an intensity of the spectra generated by means of filtering, or for the monochrome radiation to be within a spectral range not covered by the original spectrum of the polychrome radiation elements.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
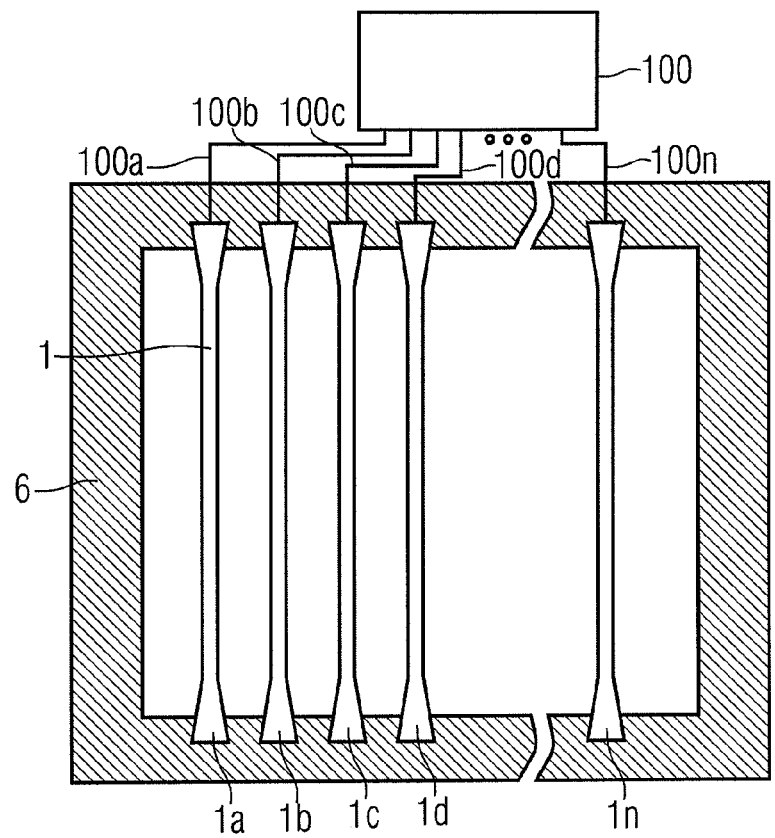
FIG. 1a shows an embodiment of an arrangement of thermal radiation elements, so-called filaments.

Before the present invention will be explained in more detail below with reference to the accompanying figures, it shall be noted that the drawings are not realized to scale for better comprehensibility. In addition, identical reference numerals are used for objects and functional units having identical or similar functional properties, repeated descriptions of said objects and functional units being dispensed with. It shall further be noted in this context that on the one hand, sections referring to objects having similar or identical functional properties are exchangeable between the descriptions of the different embodiments unless explicitly stated otherwise. On the other hand, it shall be noted that shared utilization of a reference numeral for an object occurring in more than one embodiment does not indicate that said objects have identical features and properties in the different embodiments or in the embodiment concerned. Shared or similar reference numerals, thus, do not represent any statement regarding the specific configuration and positioning.

In this context, the term "spectrum" is used for generally describing the wavelength-related composition of electromagnetic radiation, the terms "spectral range" and "wavelength range" being used synonymously and describing a range of wavelengths defined by a lower limit or minimum wavelength and by an upper limit or maximum wavelength. Two spectral ranges or wavelength ranges are the same, or identical, if they have the same minimum and the same maximum wavelengths. Two spectral ranges or wavelength ranges are different if they differ either in terms of the minimum wavelength and/or in terms of the maximum wavelength. In addition, two spectral ranges or wavelength ranges are referred to as being non-overlapping if the maximum wavelength of one spectral range is smaller than the minimum wavelength of the other spectral range.

In addition, the term "monochrome spectrum" is used when the spectrum essentially, i.e. while neglecting a scattering of the wavelength, comprises only one wavelength, and the term "polychrome spectrum" is used when the spectrum comprises more than one wavelength, while neglecting the scattering. A spectrum is referred to as a discrete spectrum if it comprises only one or more monochrome spectra, and is referred to as a continuous spectrum if it comprises, between a first cut-off wavelength and a second wavelength, all of the wavelengths contained within this range. A narrow-band spectrum generally designates a spectrum comprising a discrete or a continuous spectrum of a smaller bandwidth, i.e. of a smaller wavelength range, than a wide-band spectrum.

Before the individual embodiments of the figures are addressed, general aspects of embodiments of the radiation generation device for generating a resulting electromagnetic radiation having an adjustable spectral composition shall first be described. Embodiments of the radiation generation device comprise individual ranges emitting electromagnetic radiation, which will also be referred to as elements, radiation elements, radiation emitters or light emitters below. The radiation generation of the radiation elements may be based on various physical principles. The elements for generating the radiation may be manufactured by means of technologies known from semiconductor and microsystems technologies, such as lithography, etching and coating processes. By means of said methods, radiation generation devices may be generated which have thermal radiators as radiation elements in the form of thin beams that may be used like an incandescent filament in "incandescent lamps" by means of heat for emitting electromagnetic radiation. These embodiments of the radiation elements are particularly advantageous in infrared spectral ranges.

In addition, organic light emitting diodes (OLEDs), inorganic light emitting diodes (LEDs) or semiconductor lasers or laser diodes may be laterally structured as radiation elements that may be manufactured such that they are adapted to different wavelength ranges. In organic light emitting diodes, one single electrode may be generated and laterally structured instead of a multitude of individual organic light emitting diodes and, in this manner, a large-area diode may be locally excited, e.g. in a strip-shape, to emit radiation.

Depending on the implementation, embodiments may therefore cover large spectral ranges, but also relatively small ranges within a wide electromagnetic spectrum. Due to the combination with an optical means for spectral decomposition of the emitted radiation and an aperture or opening, embodiments of the radiation generation device enable a spectrally modulatable light source that may be generated without any costly adaptations or implementations of the radiation elements. In particular, "tuning" of radiation sources, which is known from other conventional approaches, such as with lasers by performing mechanical adaptations of the laser cavity, or rotation of a diffraction grating within a monochromator is avoided. Thus, embodiments of the present radiation generation device enable a marked improvement of the stability of the radiation source as compared to conventional technology. Instead of tuning, the embodiments of the radiation generation device comprise exploiting the lateral structuring, i.e. the several radiation elements that are controllable independently of one another, in order to change or adjust the wavelength composition of the spectral constituents unified within the aperture.

Due to the production-related possibility of integration and direct utilization of the radiation elements, high energy efficiency can be achieved.

The wavelength ranges that may be used for the resulting electromagnetic radiation may be changed within the emission spectrum of the radiation elements by adapting a few system parameters, for example the implementation and properties of the means for spectrally splitting up the radiation, also referred to as a dispersive optical element, and of the aperture, also referred to as an optical opening. Thus, different embodiments of the radiation sources or radiation generation device for generating resulting electromagnetic radiation comprising adjustable spectral composition may be created by means of few adaptations.

The architecture of the inventive radiation generation devices enables production of the entire spectrally modulatable light source in microtechnology or while using molding and injection molding technologies. The small sizes of the individual radiation elements enable relatively high temporal modulation frequencies, whereby embodiments of the radiation generation device for measurement principles may be enabled using the lock-in method (modulation of the source and demodulation upon receipt of the detected signal; TDM—time-division multiplexing), so that an improved signal-to-noise ratio (SNR) can be achieved. In addition, embodiments of the radiation generation device for generating a resulting electromagnetic radiation comprising an adjustable spectral composition enable wave modulation, for example in communication engineering, that may be used for an improved signal-to-noise ratio and for increasing the data transmission rate (WDM—wavelength-division multiplexing). The radiation generation device, which may also be referred to and used as a modulatable light source, comprises no mechanically movable parts and may be designed in a robust manner, which is advantageous, among other things, for employing portable devices.

FIG. 1a shows a schematic view of an arrangement of a multitude of radiation elements 1 arranged on a substrate 6. Below, reference numeral 1 will be generally used for the radiation elements, and reference numerals 1a, 1b, 1c, etc. will be used for designating individual radiation elements (see FIG. 1a). The radiation elements 1 and/or 1a-1n may be configured, e.g., as filaments, i.e. as thermal radiation elements. As is depicted in FIG. 1a, the filaments may be arranged on the substrate 6 in a strip-type manner and parallel to one other. In addition, individual or all of the filaments may have the same dimensions (length, width, thickness) or different dimensions. Alternatively, some or all of the filaments may have other shapes than the strip shape.

The radiation elements, in particular the filaments, 1a to 1n may have a height (dimension perpendicular to the substrate plane) ranging from 100 nm to 100 μm or 500 nm to 10 μm, a width (a dimension within the substrate plane) from 1 to 200 μm, or 5 to 100 μm, or a length (perpendicular to the other dimension within the substrate plane) ranging from 10 μm to 100 mm or 100 μm to 1 mm.

As their materials, the filaments may comprise, for example, a metal, a metal alloy or an electrically conductive metal/non-metal compound or a semiconductor material or a conductive material, e.g. graphite-type carbon, or compounds of non-metals. In addition, the filaments 1a to 1n may consist of a stack of different materials, which combine, e.g., the functions of an electrical conductor, a barrier or a diffuse barrier and a material having a high emission rate.

In accordance with an embodiment as is shown in FIG. 1, the filaments 1a to 1n may be arranged in a self-supported manner on a substrate carrier 6 or substrate frame 6 and may be mechanically connected to same. The substrate 6 may be a silicon-on-insulator substrate (SOI substrate) or a silicon substrate, for example.

The radiation elements 1 or 1a to 1n may be controlled independently of one another and, thus, be excited to emit the radiation element specific electromagnetic radiation. FIG. 1a further shows a controller 100 configured to selectively activate individual or several radiation elements of the multitude of radiation elements 1a to 1n to adjust the spectral composition of the resulting electromagnetic radiation of the radiation generation device. For selective control, the radiation element 1a is electrically connected to a conductive pattern 100a, the second radiation element 1b is electrically connected to a second conductive pattern 100b, the third radiation element 1c is electrically connected to a third conductive pattern 100c, the fourth radiation element 1d is electrically connected to a fourth conductive pattern 100d, and the $n^{th}$ radiation element 1n is electrically connected to an $n^{th}$ conductive pattern 100n. The electrical conductive patterns 100a to 100n may be electrically insulated and may be electrically connected, independently of one another, to n different external contacts so as to be able to connect a controller 100 that is external to the radiation generation device, and to be able to control, via the controller 100, the spectral compositions of the resulting electromagnetic radiations. In further embodiments, several radiation elements may be electrically connected to the same conductive pattern and possibly to the same external contact so as to be able to activate them together. For example, the radiation elements 1a and 1b may be connected to a shared conductive pattern, and the radiation elements 1c and 1d may be electrically connected to another shared conductive pattern, or e.g. the elements 1a, 1d and 1n may be electrically connected to a shared conductive pattern. Alternatively, the controller 100 may also be integrated into the radiation generation device, e.g. by means of a controller 100 integrated in the silicon substrate or a controller 100 integrated into the functional layer of an SOI substrate.

The controller 100 may be configured to successively activate individual, or combinations of individual, radiation elements to perform, e.g., a spectral analysis or wavelength modulation or to temporally change intensities of the respective radiation element specific electromagnetic radiations so as to perform an amplitude modulation, for example.

Figure 1B:
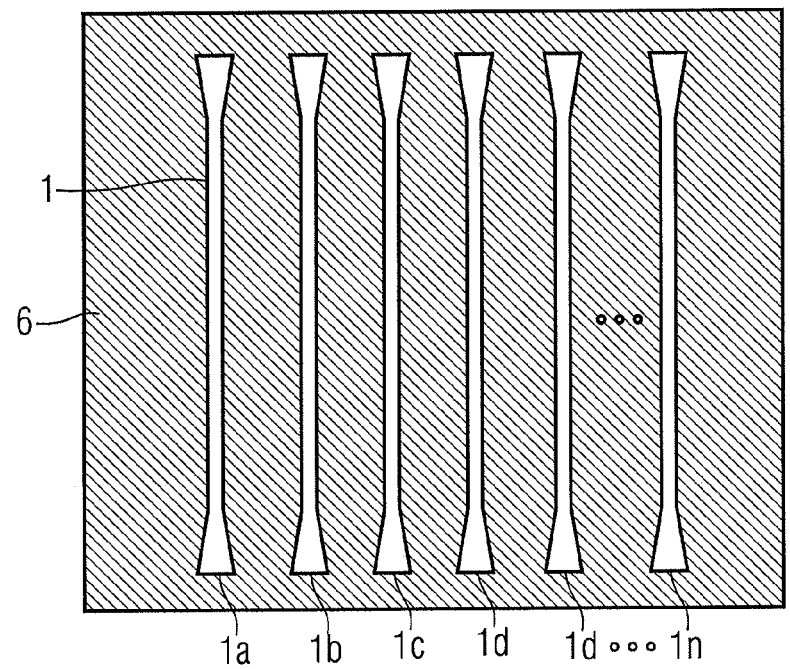
FIG. 1b shows an embodiment of an arrangement of light emitting diodes as radiation elements.

FIG. 1b shows a schematic top view of another embodiment of an arrangement of radiation elements 1 or 1a to 1n. Like in FIG. 1a, the radiation elements are arranged in a strip-type manner, but are implemented, in FIG. 1b, as organic or inorganic light emitting diodes or as laser diodes. The individual radiation elements may be individual diodes 1a to 1n or be realized by a large-area diode that may be excited, in a spatially limited manner, by structured electrodes to emit electromagnetic radiation. In other words, for the embodiment with large-area diodes, reference numerals 1a to 1n designate the spatial structures of the large-area diode, which may be excited independently of one another.

The carrier substrate 6 on which the radiation elements are arranged may be implemented as a silicon or glass substrate. As in FIG. 1a, the radiation elements may be controlled independently of one another via the lines 100a to 100n and, thus, be excited to emit the radiation element specific electromagnetic radiation. The explanations given on the radiation elements (identical or different dimensions of the individual radiation elements, identical or different distances, identical or different shapes, independent control, etc.) in FIG. 1a shall also apply, accordingly, to the radiation elements in FIG. 1b or to other radiation elements that may be employed for embodiments of the radiation generation device.

Figure 2A:
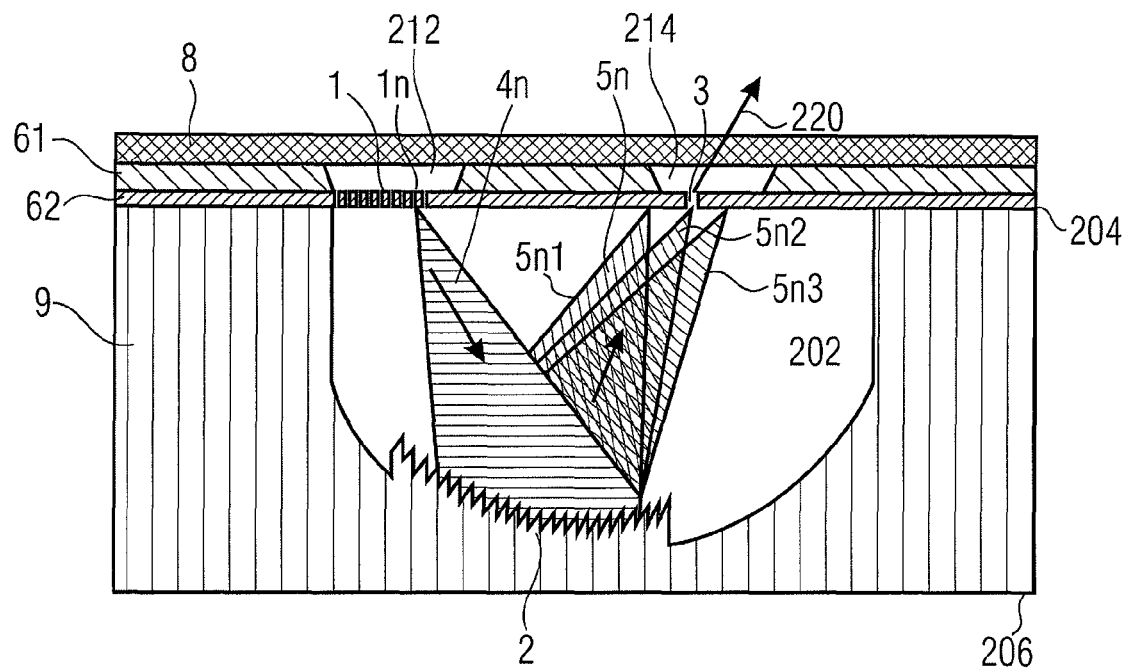
FIG. 2a shows a schematic cross section of a first embodiment of a radiation generation device for generating a resulting electromagnetic radiation with a multitude of similar thermal radiation elements, FIG. 2a depicting, by way of example, three spectral constituents of a radiation element specific electromagnetic radiation of a radiation element.

FIG. 2a shows a schematic cross section of a first embodiment of a radiation generation device comprising a first carrier substrate 62, a diaphragm layer or functional layer 61, a second carrier substrate 9, and an encapsulation substrate 8. The second carrier substrate 9 has a first surface 206 and a surface 204 opposite said first surface. The second carrier substrate 9 further has a one-sided recess or cavity 202 that is upwardly opened, in the orientation of FIG. 2a, i.e. that comprises an opening on the side of the second surface 204. The second surface 204 has the functional layer 61 arranged thereon, wherein the radiation elements 1, e.g. the radiation elements 1a to 1n of FIG. 1a, as well as the optical opening 3 are formed. The radiation elements are laterally separated by continuous recesses extending from a first surface of the functional layer, which faces the second carrier substrate 9, to a second surface, opposite the first one, of the functional layer 61, and the optical recess is formed by a continuous recess within the functional layer, which also extends from the first surface of the functional layer 61 to the second surface of the functional layer 61 (see FIG. 2a). That surface of the functional layer 61 which faces away from the second surface 204 of the second carrier substrate, i.e. the second surface of the functional layer 61, has the first carrier substrate 62 arranged thereon. The first carrier substrate 62 has a first continuous recess 212 arranged above the radiation elements 1 and a second continuous recess 214 arranged above the optical opening 3. The continuous recesses 212 and 214 of the carrier substrate 62 extend from a first surface of the carrier substrate 62, which faces the functional layer 61, to a second surface of the carrier substrate 62, which is opposite the first one. Above the first carrier substrate 62, i.e. on that surface of the first carrier substrate 62 which faces away from the functional layer 61, or on the second surface of the first carrier substrate 62, the encapsulation substrate 8 is disposed. The encapsulation substrate 8 may be configured, for example, to hermetically seal a cavity formed from the first recess 212, the second recess 214 of the first carrier substrate, the interstices between the radiation elements in the functional layer 61 and the optical opening 3 in the functional layer 61, as well as the recess 202 of the second carrier substrate.

In the embodiment of FIG. 2a, the radiation elements 1a to 1n, the recess in the second carrier substrate 9, the optical opening 3, and the second recess 214 are arranged in the substrate carrier such that the radiation element specific electromagnetic radiations of the activated radiation elements 1a to 1n propagate, within the recess 202, as far as the dispersive optical element, from where they are deflected, also within the recess 202, in the direction of the optical opening, and may exit the radiation generation device through the optical opening 3 and the second recess 214 as well as the transparent encapsulation substrate as constituents of the resulting electromagnetic radiation 220. Therefore, the first and second carrier substrates as well as the functional layer may be configured to be non-transparent, for example, or may comprise non-transparent materials.

In alternative embodiments of the radiation generation device, further layers or substrates may be arranged between the second carrier substrate 9 and the functional layer 61, between the functional layer 61 and the first carrier substrate 62, and between the first carrier substrate 62 and the encapsulation substrate 8, respectively. It is also possible for further embodiments to comprise no encapsulation substrate 8. The dispersive optical element 2 may further comprise the same material as the second carrier substrate 9, for example it may be made of same during manufacturing, or it may be made of a different material, which is deposited onto or into the recess 202 of the second carrier substrate 9 and structured.

The mode of operation of the radiation generation device will be described below with reference to FIGS. 2a to 2c by means of an embodiment wherein the radiation generation device comprises thermal radiation elements 1 that generate electromagnetic radiation having a wide-band, polychrome spectrum as the radiation element specific electromagnetic radiation when being activated or excited. However, the mode of operation is independent of the physical principle of generating the radiation element specific electromagnetic radiation, so that the explanations shall also apply, accordingly, to radiation elements configured to generate the radiation element specific electromagnetic radiation by means of other physical principles, e.g. light emitting diodes.

Specifically, FIG. 2a shows an activated radiation element 1n generating radiation element specific electromagnetic radiation 4n in the direction of the optical dispersive element 2 (see arrow). The optical dispersive element 2 is configured such that it deflects the radiation element specific electromagnetic radiation 4n, more specifically its spectral constituents, in dependence on the angle of incidence, in such different manners that different spectral constituents are reflected to different areas or solid angles. FIG. 2a shows the deflected or reflected spectrum 5n comprising the exemplary first constituent 5n1, a second spectral constituent 5n2, and a third spectral constituent 5n3. As is shown in FIG. 2a, the dispersive optical element 2 splits up the radiation element specific electrical radiation 4n into a multitude (here 3) of spectral constituents, e.g. 5n1 to 5n3, which are deflected in different directions or solid angles. In this context, the dispersive optical element 2 and the optical opening 3 are arranged and configured such that one of the spectral constituents, in FIG. 2a the second spectral constituent 5n2, of the radiation element specific electromagnetic radiation 4n may pass through the optical opening 3. The other spectral constituents 5n1 and 5n3 are deflected such that they do not impinge upon the optical opening 3 or that they cannot pass or exit though same, but impinge upon the functional layer 61 adjacently to the optical opening 3, for example. In the present case, the optical opening 3 is an actual opening in the sense of a recess within the functional layer, and the functional layer is configured to be non-transparent, i.e. it absorbs or reflects the light, for example, advantageously absorbs it. In other words, the arrangement of the individual radiation elements of the dispersive optical element 2 and of the optical opening 3 in relation to one another as well as the configuration of the dispersive optical element 2 with regard to its angles of incidence and wavelength-dependent properties enable that of each radiation element, only a particular spectral constituent or, more generally, only radiation element specific electromagnetic radiation of a particular spectrum or wavelength range is deflected (and focused) to the opening 3 and that therefore, the spectral composition of the resulting radiation exiting the radiation generation device (see arrow bearing the reference numeral 220) may be adjusted by selectively activating one or more radiation elements 1a to 1n. In other words, the original spectrum of the radiation element specific electromagnetic radiation is filtered and limited to the second spectral constituent.

Figure 2B:
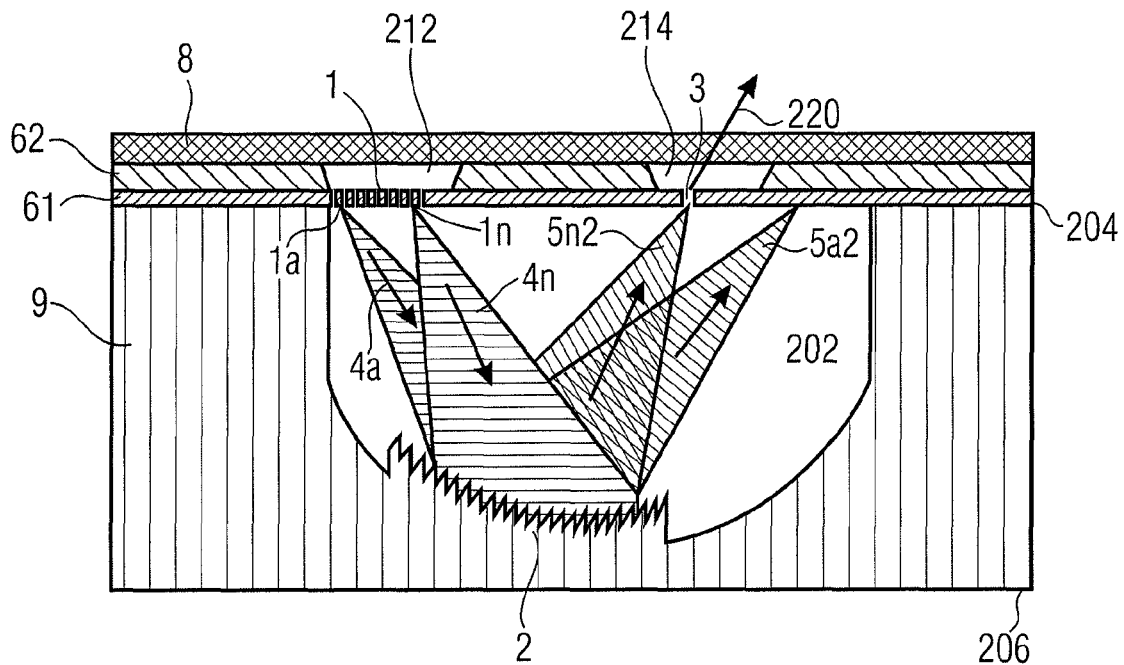
FIG. 2b shows the schematic cross section of the first embodiment of FIG. 2a, FIG. 2b depicting the different spatial deflections of the same spectral constituent for two similar radiation elements.

FIG. 2b shows the same embodiment of the radiation generation device of FIG. 2a; however, in FIG. 2b, the first radiation element 1a and the $n^{th}$ radiation element n are activated, so that the first radiation element generates a first radiation element specific electromagnetic radiation 4a, and the $n^{th}$ radiation element generates a further radiation element specific electromagnetic radiation 4n. Both radiation elements 1a and 1n are identical in FIGS. 2a to 2c, and they generate the same radiation element specific electromagnetic spectrum, i.e. both radiation element specific electromagnetic radiations 4a and 4n have the same spectrum, that is, they have the same wavelength range with the same minimum wavelength and the same maximum wavelength. Both radiation element specific electromagnetic radiations 4a and 4n impinge upon the dispersive optical element 2 and are split up into their spectral constituents. To illustrate the operating principle, however, FIG. 2b shows only the second spectral range, by analogy with FIG. 2a, of both radiation element specific electromagnetic radiations, in each case. In FIG. 2b, the further radiation element specific electromagnetic radiation 4n is spectrally split and deflected by the optical dispersive element 2 such that only the second spectral constituent 5n2 of the further radiation element specific electromagnetic radiation 4n exits through the optical opening 3. As is further depicted in FIG. 2b, the same second spectral constituent 5a2, i.e. the same wavelength range within the spectrum of the first radiation element specific electromagnetic radiation 4a, is deflected in a different direction than the corresponding spectral constituent 5n2 of the further radiation element specific electromagnetic radiation 4n. In other words, FIG. 2b shows the different deflections of the same spectral range by the dispersive optical element 2 because of the different angle of incidence upon the optical dispersive element 2, which is due to the different positions of the individual radiation elements 1a to 1n.

Figure 2C:
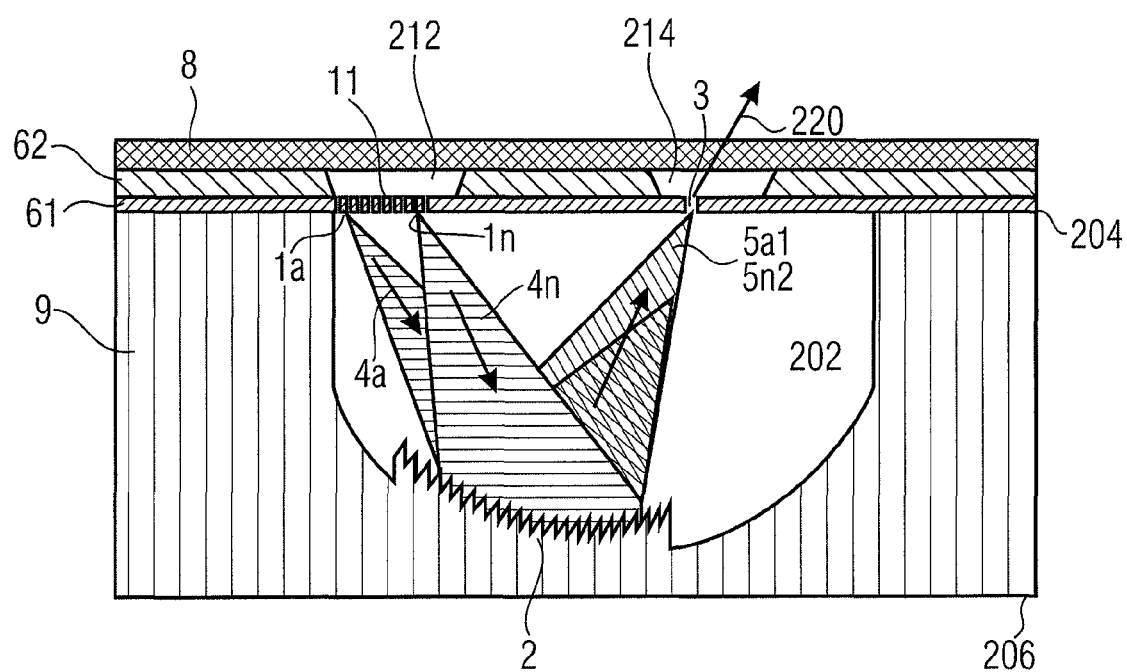
FIG. 2c shows the schematic cross section of the first embodiment of FIGS. 2a and 2b, FIG. 2c depicting the superposition of two different spectral constituents of two similar radiation elements.

FIG. 2c, in turn, shows the first and further radiation element specific electromagnetic radiation 4a and 4n generated by activating the first radiation element 1a and the $n^{th}$ radiation element 4n. Unlike FIG. 2b, however, FIG. 2c shows the superposition of the first spectral constituent 5a1 of the first radiation element specific electromagnetic radiation 4a with the second spectral constituent 5n2 of the further radiation element specific electromagnetic radiation 4n. In other words, the dispersive optical element 2c is configured, in FIG. 2c, to direct the first spectral constituent 5a1 in the same direction and/or the same solid angle as the second spectral constituent 5n2, the first spectral constituent being different from the second spectral constituent 5n2.

In other words, embodiments of the radiation generation device may comprise a multitude of radiation elements 1, 1a-1n that are configured to generate radiation element specific electromagnetic radiation 4a-4n, respectively, when they are activated, each radiation element of the multitude of radiation elements being activatable independently of other radiation elements of the multitude of radiation elements, and comprise a dispersive optical element 2 and an optical opening 3, a first radiation element 1a of the multitude of radiation elements being configured to generate a first radiation element specific electromagnetic radiation 4a, and a second radiation element 4n of the multitude of radiation elements being configured to generate a second radiation element specific electromagnetic radiation 4n, a spectral range of the second radiation element specific electromagnetic radiation 4n being identical with a spectral range of the first radiation element specific electromagnetic radiation 4a, and the dispersive optical element 2 being configured to deflect the radiation element specific electromagnetic radiations 4a-4n, in dependence on their angles of incidence and their wavelengths, in such a manner, or to split up the radiation element specific electromagnetic radiations 4a-4n in such a manner that a first spectral constituent of the first radiation element specific electromagnetic radiation 4a may exit through the optical opening 3, and a first spectral constituent of the second radiation element specific electromagnetic radiation 4n cannot exit through the optical opening 3, the first spectral constituent of the first radiation element specific electromagnetic radiation and the first spectral constituent of the second radiation element specific electromagnetic radiation being identical.

Embodiments may further comprise a dispersive optical element 2 configured to deflect the radiation element specific electromagnetic radiations 4a-4n, in dependence on their angles of incidence and their wavelengths, or to split up the radiation element specific electromagnetic radiations 4a-4n, such that a first spectral constituent of the first radiation element specific electromagnetic radiation 4a and a second spectral constituent of the second radiation element specific electromagnetic radiation 4n may exit through the optical opening 3, the first spectral constituent of the first radiation element specific electromagnetic radiation being different from the second constituent 5n2 of the second radiation element specific electromagnetic radiation.

In further embodiments, the radiation elements may be configured to generate radiation element specific radiations of different spectra, and the spectral constituents into which the radiation element specific radiations are split up may be different. In addition, in some embodiments, the spectral constituents, e.g. the first spectral constituent 5a1 and the second spectral constituent 5n2, may overlap irrespective of whether said radiation elements are identical or different, whereas in other embodiments, both spectral constituents are adjacent to each other, or are free from overlap.

In further embodiments of FIG. 2a, the radiation elements 1 consist of heatable structures, so-called filaments. Said filaments 1, or 1a to 1n, may be arranged on or in a shared substrate, for example a carrier substrate 6 or 61, or a shared diaphragm 62 or functional layer 62 carried by a substrate, e.g. carrier substrate 61, or may be arranged in a self-supporting manner, mechanically secured by a shared substrate 6 (see FIG. 1a). The shared substrate may be a so-called silicon-on-insulator substrate (SOI) 61, 62. Such SOI substrates consist of a functional layer 61 of monocrystalline silicon, which is connected, by a thin oxide layer (not shown in FIGS. 2a to 2c), to a silicon carrier layer 62 having a thickness of typically several 100 µm, also referred to as a carrier substrate 62. The filaments 1 may be made from the SOI substrate 61, 62 using known methods from semiconductor and microsystems technology, such as photolithography, etching or coating. Self-supporting filaments 1 may be created, for example, by partially removing the carrier layer (carrier substrate) 62 and by laterally structuring the functional layer 61 of the SOI substrate. The filaments 1 may be adjacently arranged in a strip-type and regular manner or at variable distances. In addition, the filaments 1 may also have other geometries than the strips depicted in FIGS. 1a and 1b.

On the reverse side, the SOI substrate 61 may be encapsulated with a further substrate, which is also referred to as an encapsulation substrate 8, for example a glass substrate. On the front side, the SOI substrate 61, 62 may be directly connected to a further substrate 9, which is also referred to as a second carrier substrate 9 and has a dispersive optical element 2 located thereon or therein. The second carrier substrate 9 may be manufactured from a glass or metal material, and in the embodiment of FIGS. 2a to 2c, it has two functions. Firstly, hermetic encapsulation of the system may be achieved by the second carrier substrate. Secondly, the second carrier substrate 9 forms the carrier for the dispersive optical element 2, the dispersive optical element 2 being configured as a concave diffraction grating 2 in the embodiment of FIGS. 2a to 2c. Such concave diffraction gratings enable both wavelength-dependent splitting of the radiation element specific electromagnetic radiation and refocusing of the filaments or of the spectral constituents following the splitting or deflection into the vicinity or into the plane of the optical opening 3, which, in the embodiment of FIGS. 2a and 2c, is formed, is realized by a slit, or gap, in the functional layer 61. In the following, the concave diffraction grating 2 will also be simply referred to as diffraction grating 2.

Diffraction gratings, also concave diffraction gratings, may be manufactured, for example, using methods of ultra-precision cutting or corresponding molding and embossing processes. Both the substrate 9 and the diffraction grating 2 may share a manufacturing step, e.g. molding, or be manufactured separately. For example, the diffraction grating 2 may be created, by holographic methods, on the second carrier substrate 2, which has been previously manufactured and provided with a polymer layer. In addition, the diffraction grating 2 may consist of structures optimized within a specific wavelength range, such diffraction gratings also being referred to as blazed gratings.

The functional layer 61 has an opening 3 located therein for coupling out the electromagnetic radiation 5 generated by the filaments 1, which radiation 5 spectrally limits, in combination with the dispersive optical element 2, the spectral range that may be contributed by each of the radiation elements for the spectral composition of the resulting electromagnetic radiation.

The optical opening 3 may be selected, for example, as a rectangular slit etched into the functional layer 61. By the slit 3, spectral filtering of the radiation 5 is achieved, which radiation 5 originates from the individual elements, filaments or, generally, radiation elements, and is spectrally split up by the diffraction grating 2. The encapsulation substrate 8 may be configured to be transparent at least above the second recess 214 so as to enable the radiation 220, which passes through the slit, from the overall system, i.e. from the radiation generation device.

Connection of the substrates 61, 62, 8 and 9 may be effected by customary joining processes of semiconductor and microsystems technology, such as gluing or bonding. For example, the encapsulation substrate 8 may be connected to the first carrier substrate 62 by anodic or adhesive bonding. In addition, soldering processes, in particular laser soldering, are suited to yield a connection of the substrates 61, 62, 8 and 9. Connection of the substrates 8, 61, 62 and 9 may be effected both in a wafer bond arrangement and with singulating components.

Mutual hermetic connection of the individual substrates 8, 61, 62 and 9, which may be achieved by the above-mentioned technologies, offers the possibility of operating the filaments 1 within a vacuum or within a suitable filling gas. The filling gas may be a protective gas or an active gas, for example, such as in commercial halogen lamps. The filling gas may be advantageously configured to be gas-chemical, which, by increasing the pressure, minimizes evaporation of the filaments, changes the precipitation of the evaporated filament material on the surrounding surfaces, and supports or enables, by a corresponding reaction, recirculation of the filament material. Gas mixtures may also be employed in this context. Said gas mixtures may consist, for example, of an element of the group of halogens, such as iodine, of oxygen, or of an element of the group of noble gases, such as argon, xenon or krypton.

In addition, the filaments 1 may be connected to the carrier substrate 61 by a holder suitably implemented to compensate for thermal expansion, e.g. by flexible elements or spring structures.

As was explained above, FIG. 2b shows the same embodiment as FIG. 2a. To illustrate the functional principle, the radiations 4a and 4n originating from two filaments 1a and 1n are drawn in in FIG. 2b. Said radiations are split up into their spectral components by the diffraction grating 2, respectively, FIG. 2b depicting only the second spectral component, respectively, 5a2 and 5n2. The diffraction grating 2 is configured as a concave grating, so that in addition to being spectrally split, the radiation is focused onto the exit slit 3. Due to the angular misalignment at which the radiations of the two filaments impinges upon the grating, the respectively same spectral component 5a2 and 5n2 of the different filaments 1a and 1n is focused onto a different location within the slit plane. Thus, a different spectral component passes through the slit 3 from each filament 1a to 1n. By controlling the different filaments 1a to 1n in a targeted manner, the spectral composition of the coupled-out radiation 220 may be changed.

Figure 3:
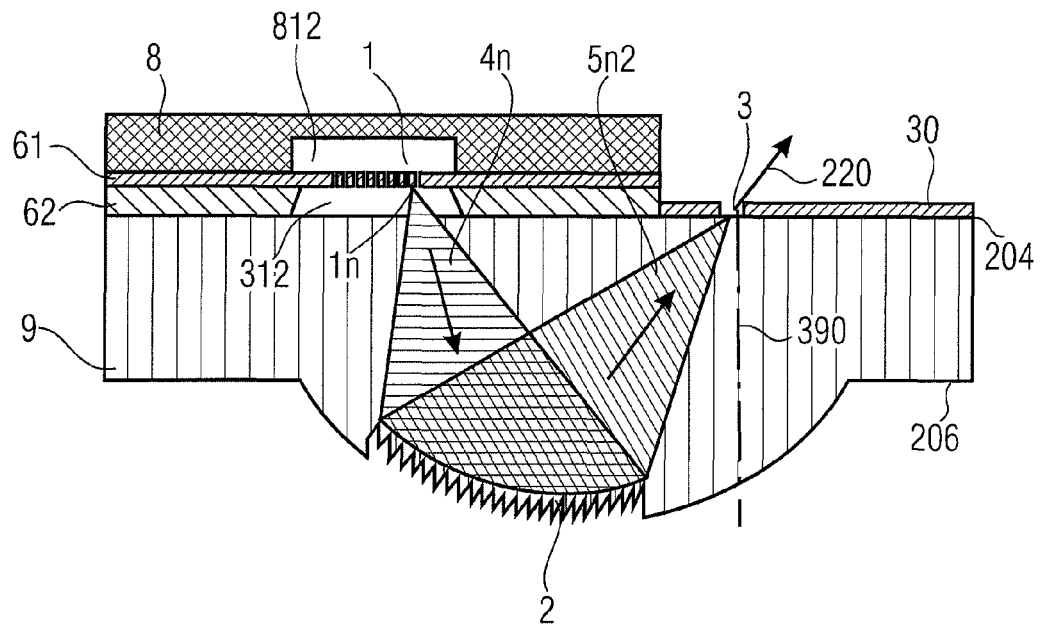
FIG. 3 shows a schematic cross section of a second embodiment of a radiation generation device comprising thermal radiation elements.

FIG. 3 shows a second embodiment of the radiation generation device, wherein the radiation elements 1 are configured as filaments 1 which, in turn, are arranged in or on an SOI substrate 61, 62. In the embodiment depicted in FIG. 3, the SOI substrate, more specifically the functional layer 62, is encapsulated, on its front side, with a further substrate 8, which is also referred to as an encapsulation substrate 8 and may be a glass substrate, for example. The dispersive optical element 2 used is, again, a concave diffraction grating 2, which is integrated, on the reverse side, into a corresponding second carrier substrate 9. The second carrier substrate 9 may be directly used for front-side encapsulation of the SOI substrate 61, 62. The second carrier substrate 9 is manufactured from a material transparent to electromagnetic radiation, for example from glass or plastic, and, at the same time it serves as the carrier substrate for the opening 3 for coupling out the resulting electromagnetic radiation 220. As is shown in FIG. 3, the optical opening 3 may be configured as a slit, for example, which consists of a laterally structured material that is arranged on the substrate 9 and is not transparent to the radiation, e.g. a metal or a stack of layers 30.

In other words, FIG. 3 generally shows a schematic cross section of a second embodiment of a radiation generation device comprising a first carrier substrate 62, a diaphragm layer, or functional layer, 61, a second carrier substrate 9, an encapsulation substrate 8, and a non-transparent layer 30. The second carrier substrate 9 has a first surface 206 and a surface 204 opposite said first surface. The second surface 204 of the second carrier substrate has the first carrier substrate 62 arranged thereon, which has a first continuous recess 312 that is arranged underneath the radiation elements 1. The continuous recess 312 of the carrier substrate 62 extends from a first surface of the carrier substrate 62, which faces the second carrier substrate 9, to a second surface of the carrier substrate 62, which is opposite the first one. The functional layer 61 is arranged above the first carrier substrate 62, i.e. on the second surface of the first carrier substrate 62. Similarly to FIGS. 2a to 2c, the radiation elements 1 are laterally separated by continuous recesses that extend from a first surface of the functional layer, which faces the first carrier substrate 62, to a second surface of the functional layer 61, which is opposite the first one. The encapsulation substrate 8 is arranged above the functional layer 61, that is, on the second surface of the functional layer 61. On the surface facing the functional layer 61, the encapsulation substrate 8 has a recess 812 that is arranged above the radiation elements 1. For example, the encapsulation substrate 8 may be configured to hermetically seal a cavity from the recess 812, the recess 312, and the interstices between the radiation elements within the functional layer 61. On the second surface 204 of the second carrier substrate 9, the non-transparent layer 30 is arranged laterally, i.e. adjacently to the first carrier substrate 62, and comprises the optical opening 3 in the form of a continuous recess that extends from a first surface of the layer 30, which faces the second carrier substrate, to a second surface of the layer 30, which is opposite the first surface.

In FIG. 3, the second carrier substrate 9 is transparent, and the radiation elements 1, the recess 312, the second carrier substrate 9, the dispersive optical element 2, and the optical opening 3 are arranged and configured such that the radiation element specific electromagnetic radiation of the activated radiation elements 1*a* to 1*n* within the second carrier substrate 9 propagates up to the dispersive optical element, where it is deflected, also within the second carrier substrate 9, in the direction of the optical opening, and may exit from the radiation generation device through the optical opening 3 as constituents of the resulting electromagnetic radiation 220.

Figure 4:
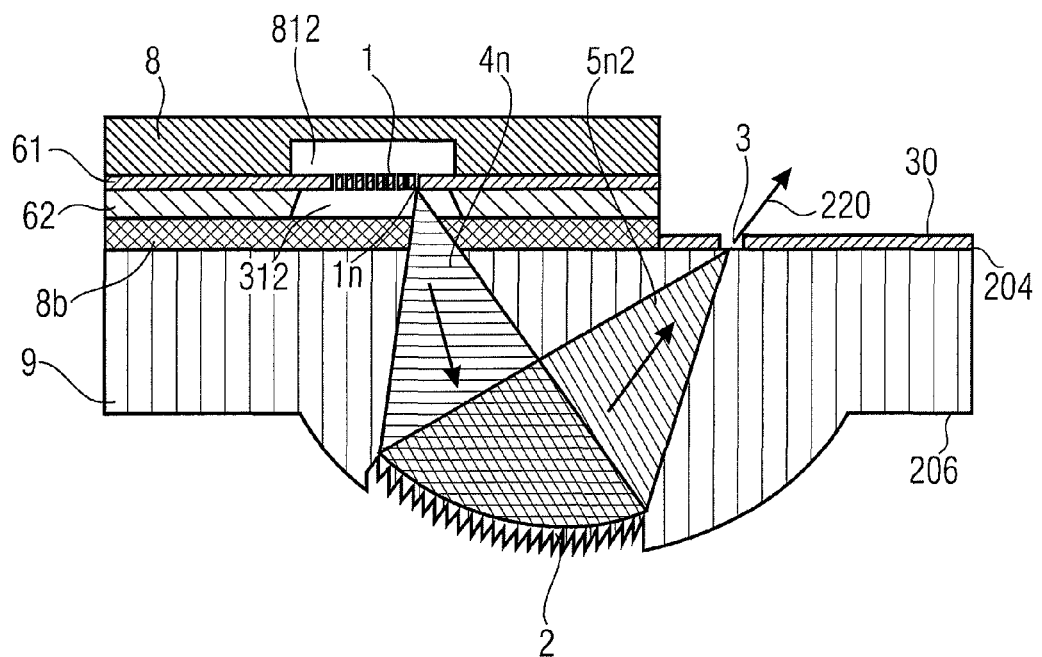
FIG. 4 shows a schematic cross section of a third embodiment of a radiation generation device comprising thermal radiation elements.

FIG. 4 shows an embodiment of the radiation generation device, wherein the filaments 1 are arranged in or on an SOI substrate 61, 62, similarly to FIG. 3. As in FIG. 3, the SOI substrate 61, 62 of FIG. 4 is encapsulated, on the front side, with an encapsulation substrate 8, for example a glass substrate. In addition to the embodiment of FIG. 3, the SOI structure 61, 62 is not encapsulated by the second carrier substrate 9, but by a further encapsulation substrate 8*b*, which is arranged, on the reverse side, on the SOI substrate and is hermetically connected to the first carrier substrate 61. Embodiments of FIG. 4 enable hermetic encapsulation of the SOI structure by the two encapsulation substrates 8 and 8*b* at the wafer level during manufacturing.

In other words, FIG. 4 generally shows a schematic cross section of a third embodiment of a radiation generation device, which is similar to the second embodiment of FIG. 3 and additionally comprises a further encapsulation substrate 8*b* arranged between the first carrier substrate 62 and the second carrier substrate 9. Embodiments of FIG. 4, thus, generally enable hermetic encapsulation of the radiation elements 1 by the two encapsulation substrates 8 and 8*b* at the wafer level during manufacturing.

Figure 5:
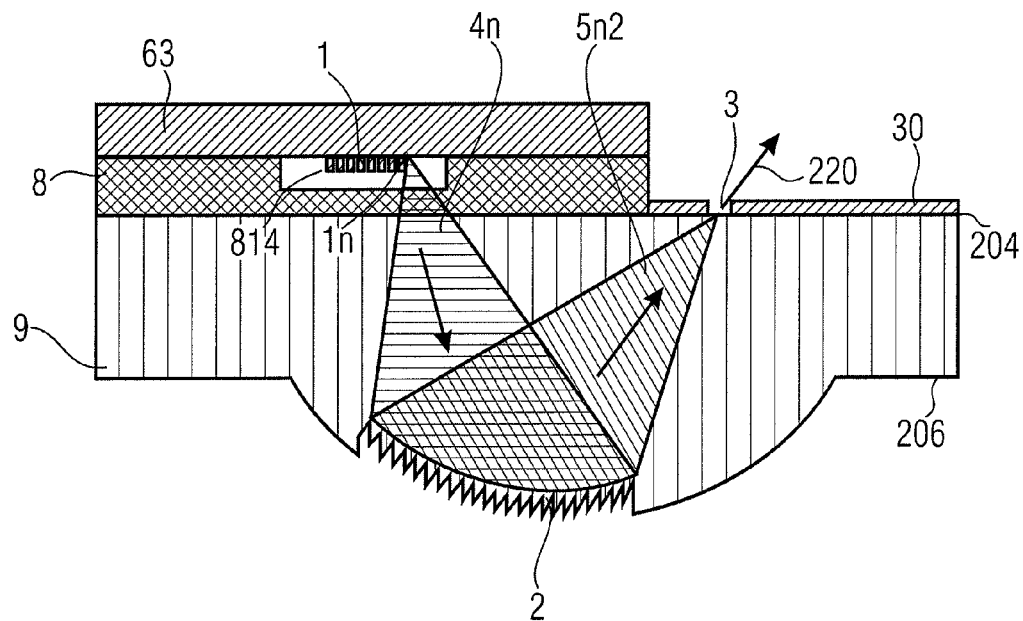
FIG. 5 shows a schematic cross section of a fourth embodiment of the radiation generation device comprising organic light emitting diodes as radiation elements.

FIG. 5 shows an embodiment of a radiation generation device wherein the radiation elements 1 are implemented as organic light emitting diodes (OLEDs). The first carrier substrate 63 for the OLED 1 may be a silicon substrate known from semiconductor technology, for example. The organic light emitting diodes 1*a* to 1*n* may be configured to be strip-shaped and may be arranged in a regular manner or at variable distances from one another. In an alternative embodiment, the radiation generation device comprises large-area diodes that may be excited, in a spatially limited manner, by structured electrodes 1*a* to 1*n* to emit electromagnetic radiation.

The first carrier substrate may be encapsulated, on the front side (on the side of the OLED) with an encapsulation substrate 8, e.g. a glass substrate 8. The dispersive optical element 2 used is, again, a concave diffraction grating 2, which is integrated into the second carrier substrate 9 on the reverse side, i.e. on the first surface 206 of the second carrier substrate 9, as already depicted in FIGS. 3 and 4. In other words, FIG. 5 shows an embodiment similar to FIGS. 3 and 4 which comprises—instead of the SOI structure 61, 62 comprising the integrated filaments 1 and the encapsulation substrate 8 arranged on the front side—a conventional substrate 63, e.g. a silicon substrate, which has the radiation elements arranged thereon in the form of organic light emitting diodes 1*a* to 1*n*. Similarly to the embodiment of FIG. 4, the embodiment of FIG. 5 can be hermetically sealed at the wafer level during manufacturing in that at the wafer level, the encapsulation substrate 8 is deposited onto the wafer with the substrate 63 and the organic light emitting diodes 1*a* to 1*n*.

In other words, FIG. 5 generally shows a schematic cross section of a fourth embodiment of a radiation generation device comprising a first carrier substrate 63, radiation elements 1, a second carrier substrate 9, an encapsulation substrate 8, and a non-transparent layer 30. The second carrier substrate 9 has a first surface 206 and a surface 204 opposite said first surface. The second surface 204 of the second carrier substrate has the encapsulation substrate 8 arranged thereon, which comprises a recess 814 arranged below the radiation elements 1.

The first carrier substrate 63 is arranged above the encapsulation substrate 8, i.e. on the second surface of the encapsulation substrate 8. The radiation elements are arranged on the bottom side of the first carrier substrate 63, i.e. on the first surface of the first carrier substrate 63, which faces the encapsulation substrate 8. The recess 814 of the encapsulation substrate 8 is arranged below the radiation elements and comprises an opening in the direction of same. The encapsulation substrate 8 may be configured, for example, to hermetically seal a cavity formed from the recess 814. The second surface 204 of the second carrier substrate 9 has the non-transparent layer 30 arranged thereon in a lateral manner, i.e. adjacently to the encapsulation substrate 8, and said non-transparent layer 30 has the optical opening 3 in the form of a continuous recess extending from a first surface of the layer 30, which faces the second carrier substrate, to a second surface of the layer 30, which is arranged opposite the first surface.

In FIG. 5, the second carrier substrate 9 is transparent, and the radiation elements 1, the recess 814, the second carrier substrate 9, the dispersive optical element 2, and the optical opening 3 are arranged and configured such that the radiation element specific electromagnetic radiations of the activated radiation elements 1*a* to 1*n* propagate, within the second carrier substrate 9, as far as the dispersive optical element, from where they are deflected, also within the second carrier substrate 9, in the direction of the optical opening, and may exit the radiation generation device through the optical opening 3 as constituents of the resulting electromagnetic radiation 220.

Instead of the organic light emitting diodes, further embodiments comprise inorganic light emitting diodes or laser diodes or a combination of said three or further types of diodes.

Figure 6:
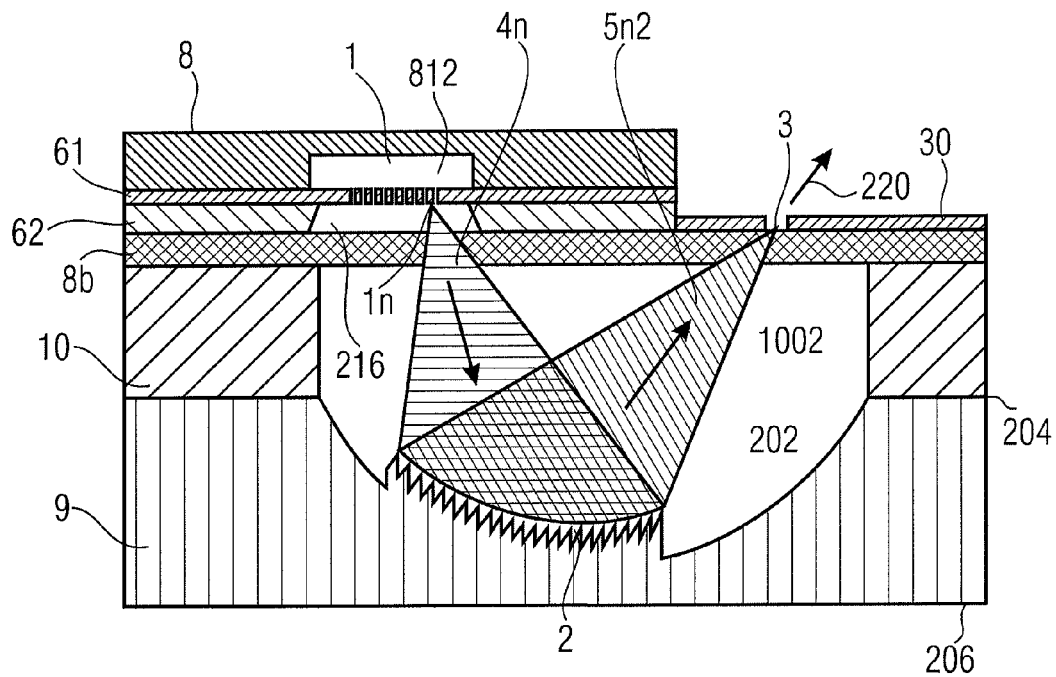
FIG. 6 shows a schematic cross section of a fifth embodiment of a radiation generation device comprising thermal radiation elements.

FIG. 6 shows an embodiment of a radiation generation device, wherein the radiation elements 1 are arranged as filaments in or on an SOI substrate 61, 62. The SOI substrate 61, 62 of FIG. 6 is encapsulated, on the front side, with a first encapsulation substrate 8 and, on the reverse side, with a second encapsulation substrate 8*b*, said second encapsulation substrate 8*b* comprising a transparent material, e.g. glass, whereas the first encapsulation substrate 8 may also comprise a non-transparent material. The second encapsulation substrate 8*b* simultaneously serves as a carrier substrate for the optical opening 3 for coupling out the radiation. As is depicted in FIG. 6, for example, said optical opening 3 may be implemented as a slit which is made of a material that is laterally structured, is arranged on the second encapsulation substrate 8*b*, and is non-transparent to the radiation, it being possible for said material to be a metal or a stack of layers 30, for example. As the diffractive optical element 2, the embodiment of FIG. 6, again, uses a concave diffraction grating 2 arranged in or on the second carrier substrate 9 and connected to the second encapsulation substrate 8*b* by means of a spacer substrate 10. Both substrates 9 and 10 may be made of glass or plastic.

In other words, FIG. 6 generally shows a schematic cross section of a fifth embodiment of a radiation generation device comprising a first carrier substrate 62, a functional layer 61, a second carrier substrate 9, a spacer substrate 10, a first and a further encapsulation substrate 8, 8*b*, and a non-transparent layer 30, as well as a dispersive optical element 2 and an optical opening 3. The second carrier substrate 9 has a first surface 206 and a surface 204 opposite said first surface. The spacer substrate 10 is arranged on the second surface 204 of the second carrier substrate, said spacer substrate 10 comprising, above the area of the recess 202 of the second carrier substrate 9, a continuous recess 1002 extending from a first surface of the spacer substrate, which faces the second carrier substrate 9, to a second surface arranged opposite the first surface of the second carrier substrate. The second surface of the spacer substrate 10 has the further encapsulation substrate 8b arranged thereon. The further encapsulation substrate 8b, i.e. that surface of the further encapsulation substrate 8 which faces away from the spacer substrate 10, has the first carrier substrate 62 arranged thereon, which comprises a recess 216 extending from a first surface of the first carrier substrate, which faces the further encapsulation substrate 8b, to a second surface of the first carrier substrate 62, which is arranged opposite the first surface. The second surface of the first carrier substrate 62 has the functional layer 61 comprising the radiation elements 1 arranged thereon. In this context, the radiation elements 1 are formed, similarly to FIGS. 2a-2c and 3, by continuous recesses extending from a first surface of the functional layer 61, which faces the first carrier substrate 62, to a second surface arranged opposite the first surface of the functional layer 61. The second surface of the functional layer 61 has the first encapsulation substrate 8 arranged thereon, which comprises a one-sided recess that has an opening on that side which faces the functional layer 61 and which is arranged above the radiation elements 1. The second encapsulation substrate 8b has the non-transparent layer 30 arranged thereon on in a lateral manner, i.e. adjacently to the first carrier substrate 62. The first encapsulation substrate 8 and the further encapsulation substrate 8b may be configured, for example, to hermetically seal a cavity formed by the cavity 812 within the first encapsulation substrate, the continuous recesses within the functional layer 61, and the recess 216 within the first carrier substrate 62. Similarly to FIGS. 2a-2c, the optical path essentially lies within the cavities. In other words, the radiation elements 1, the recess 216, the second encapsulation substrate 8b, the continuous recess 1002 within the spacer substrate 10, and the one-sided recess 202 within the second carrier substrate 9, as well as the optical opening 3 within the non-transparent layer 30 are configured and arranged such that the radiation element specific electromagnetic radiations of the activated radiation elements 1a-1n of the continuous recess 216 propagate through the transparent second encapsulation substrate 8b, through the continuous recess 1002 and the one-sided recess 202 as far as the dispersive optical element 2, from where they are deflected, also within the one-sided recess 202 and the continuous recess 1002, and, in turn, by the transparent second encapsulation substrate 8b, in the direction of the optical opening 3, and may exit the radiation generation device through the optical opening 3 as constituents of the resulting electromagnetic radiation 220.

Figure 7:
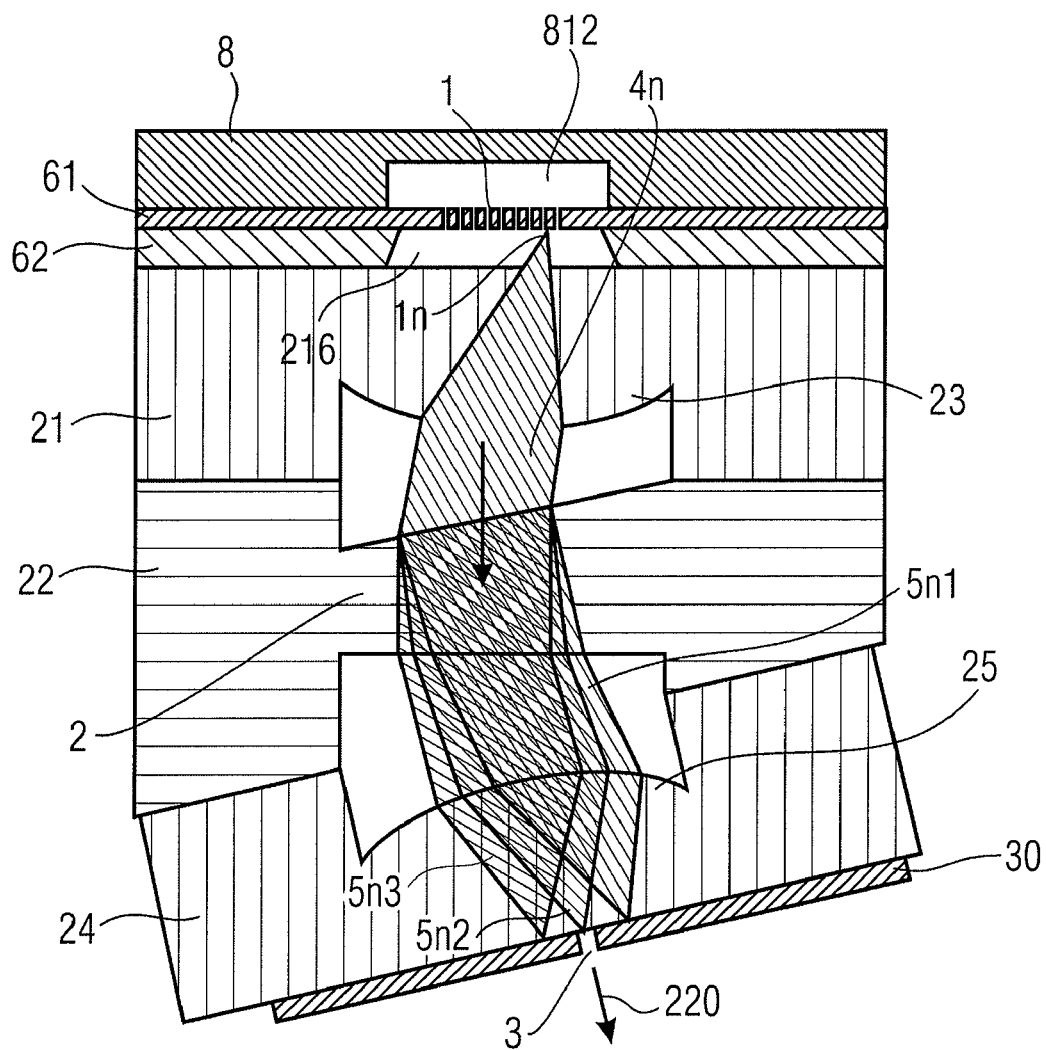
FIG. 7 shows a schematic cross section of a sixth embodiment of a radiation generation device comprising thermal radiation elements.

FIG. 7 shows an embodiment of a radiation generation device, wherein the radiation elements 1 are arranged in or on an SOI substrate 61, 62 in the form of filaments 1. On the front side, the SOI substrate 61, 62 is encapsulated with an encapsulation substrate 8, for example a glass substrate, and on the reverse side, it is encapsulated with a further substrate 21. Said substrate 21, which is adjacent to the SOI structure, has a lens 23 integrated therein, which collimates the radiation emanating from the filaments, depicted in FIG. 7 only for radiation elements 1n, and directs them onto the dispersive optical element 2 in the form of a prism 2. Said prism 2 is integrated into a further substrate 22, which, in turn, is arranged with and connected to the substrate 21 of that surface of the further substrate 21 which faces away from the SOI substrate. A further lens 25 is integrated in a substrate 24 and focuses the radiation spectrally split up by the prism 2, see the spectral constituents $5n1$, $5n2$, $5n3$, onto the optical opening, which is configured as a slit 3, for coupling out the electromagnetic radiation. Said substrate 24 additionally serves as a carrier for a material non-transparent to the radiation, e.g. a metal or a stack of layers 30, through which the slit 3 is produced by means of lateral structuring. The prism 2, which in the embodiment of FIG. 7 forms the optical dispersive element, may be replaced, for example, by a transmission grating as a dispersive optical element 2.

In other words, FIG. 7 shows a cross section as a sixth embodiment of a radiation generation device comprising a first carrier substrate 62, a functional layer 61, a first encapsulation substrate 8, a first optical substrate 21, a second optical substrate 22, a third optical substrate 24, and a non-transparent layer 30 comprising the optical opening 3. The first carrier substrate 62 has a lower, first surface and a second surface which is opposite said first surface, has the functional layer 61 arranged thereon and has the radiation elements 1 integrated therein, as was already described by means of FIG. 6. As described in FIG. 6, the functional layer 61 has a first encapsulation substrate 8 comprising a one-sided recess 812 arranged thereon, and, as is also depicted in FIG. 6, the first carrier substrate 62 has a continuous recess 216. The first optical substrate 21 is arranged below, i.e. on the first surface of the first carrier substrate 62 and has a first surface, which faces away from the first carrier substrate 62, and a second surface, which is arranged opposite said first surface. On the side of the first surface of the first optical substrate 21, the first optical substrate 21 has a lens 23. On the lower surface, i.e. the first surface of the first optical substrate 21, the second optical substrate 22 is arranged, which has a first surface on the lower side, which is arranged facing away from the first optical substrate 21, and further comprises a second surface arranged opposite the first surface of the second optical substrate 22. The second optical element 22 comprises the dispersive optical element 2. Below, i.e. on the first surface of the second optical substrate 22, the third optical substrate 24 is arranged, which has a first surface which faces away from the second optical substrate, and a second surface which faces the second optical substrate 22. The third optical substrate 24 comprises the above-described second lens 25. The non-transparent layer 30 is arranged on the first surface of the third optical substrate 24.

In further embodiments of FIG. 7, the radiation elements 1 may have different distances.

The dispersive optical elements 2 of FIGS. 3, 4 and 5 may also be diffractive optical elements.

Even though the above discussion was mainly about embodiments comprising thermal radiation elements, further embodiments may comprise, instead of the thermal radiation elements, such radiation elements that are based on a different physical principle, and vice versa. In addition, in the embodiments of FIGS. 1 to 7, a mixture of radiation elements of different physical principles may be employed as radiation elements 1a to 1n, and, for example, a radiation generation device may comprise only one thermal radiation element and one radiation element based on luminescence, or more of same.

In addition, embodiments of FIGS. 2 to 7 may additionally comprise, for example, one or more further radiation elements, i.e. a second multitude of radiation elements, and a further or second dispersive optical structure, which are arranged to the right (with regard to the figures) of a vertical axis or plane running through the center of the optical opening, so as to enable further spectral components for the resulting electromagnetic radiation. It is only in FIG. 3 that said axis or plane 390 is drawn in, by way of example. What was discussed for FIGS. 1 to 7 shall also apply to this expansion. This expansion may have, for example, the same arrangement, but mirror-inverted, as that shown in FIGS. 2 to 7, so as to thereby increase the intensity of the resulting electromagnetic radiation, or it may comprise any other arrangement to be able to generate other spectral components.

Even though the description has sometimes differentiated between layers, diaphragms and substrates, the substrates or diaphragms described in FIGS. 1 to 7 may also be referred to as layers, and vice versa. Moreover, as an alternative to the embodiments, additional suitable substrates or layers, possibly comprising corresponding recesses, may be arranged between the substrates and layers.

Embodiments of the radiation generation device may be employed in any fields wherein radiation sources (or light sources) comprising modulatable or changeable spectral emission may be used. As was explained above, one application is, for example, in optical spectral analysis, wherein a statement is to be made about the composition, the condition or other properties by means of the interaction of electromagnetic radiation with the surface or the volume of an object, a liquid, or a gas. The wavelength-dependent reflection, transmission, absorption, and scattering properties are dependent on the material that may be employed for its identification. Several basically different variants are used. One variant of applying the inventive solution is as follows. Using the light source represented, a measurement object that is to be spectrally analyzed is transluminated. By sequentially changing the emission spectrum, the spectrum to be determined in accordance with the measurement principle may be captured by a single detector. From this spectrum, the material composition or concentration of specific substances may be inferred. Solid, liquid or gaseous substances may be analyzed in this manner. In the application, spectra of a high number down to two measurement values are captured for identification. The validity and reliability of the measurement will change in dependence thereon. Embodiments of the radiation generation device enable adaptation to different wavelength ranges and to the widths and number of the spectral intervals within which the spectrum is varied.

That range of the electromagnetic spectrum that excites characteristic molecular vibrations or their overtones, or combination vibrations, is particularly suitable for numerous examinations of objects made of organic materials. These ranges are referred to as medium infrared (MIR: wavelengths from 2,500 nm to 25 μm) or near infrared (NIR: wavelengths between 780 nm and 2,500 nm). Other substances and compounds, too, may have characteristic absorption bands within this range. However, visible light (380 nm . . . 780 nm), the ultraviolet spectrum (wavelengths below 380 nm) as well as far infrared (FIR) above 25 μm may also be taken into account for the examinations.

In other words, embodiments of the radiation generation device may be employed, for example, in the field of spectral analysis or spectroscopy, i.e. in fields wherein light of a selected wavelength interacts with matter, and wherein the characteristic of the interaction is interpreted by changes in intensity, possibly in dependence on the wavelength. Various approaches are applied here, for example measurements in reflection, transmission, absorption, transflection, fluorescence, excitation of processes, induced emission, or evaluation of so-called RAMAN signals. The measurements may be effected, inter alia, on the surface or the volume of solid matters, in liquids, gasses or plasmas, the objects may be present and be analyzed at normal pressure, in a reduced atmosphere, or at increased pressure. Furthermore, the objects may be present in a basic state or in an excited form.

An advantageous variant for such measurements comprises narrow-band, with regard to the wavelength, illumination of an object using a source for a tunable spectrum, and detection by means of a simple light-sensitive detector.

A further application comprises measuring the spectral sensitivity of radiation detectors or photodetectors. Both individual detectors and detector arrays may be measured. The inventive solution provides a light source with which the detector(s) is/are irradiated with radiation (light) of different known wavelength compositions. In this manner, it is possible to determine the spectral sensitivity.

Embodiments of the radiation generation device may be additionally used for measuring the color of an object. In this context, the modulatable light source is configured such that this light is emitted within the visible wavelength range, the surface to be analyzed is irradiated, and the light that is reflected back is detected by an individual detector. Usually, the corresponding light source is configured such that the emitted wavelength ranges in combination with the wideband sensitivity of the individual detector are adapted to the eye's spectral sensitivity (red, green, blue). For detecting so-called "methame" colors, measurement of the spectrum may be effected with increased spectral resolution and number of measurements.

Embodiments of the radiation generation device have no movable elements and may therefore be potentially employed in portable devices. By means of system integration, implementations of the invention enable a miniaturized, low-cost, spectrally tunable radiation source. The invention enables integration of radiation sources with different emission principles. In this context, both thermal radiation elements and non-thermal radiation elements, e.g. luminescent radiation elements, organic or inorganic light emitting diodes (LEDs, OLEDs) may be integrated.

The spectral composition of the radiation emitted by the radiation generation device or source may be influenced by the selection of the emission principle, by the implementation (e.g. the geometry), by the number of radiation emitting elements and their control, by the implementation of the dispersive element as well as by the position and the configuration of the optical opening.

Embodiments of the radiation generation device comprise individual or a multitude of radiation emitting areas or elements. By using micro- and lithographic technologies, these filaments may be manufactured on the basis of the various physical emission principles. For example, self-supporting beams of a high-melting metal or metal alloy may be structured on a silicon or SOI substrate (silicon/silicon dioxide/silicon). They are individually controllable. By combination with an optical system and a dispersive element, the radiation is split up, in a wavelength-dependent manner, within an aperture plane. Only part of the spectrum may exit from the source through an aperture, such as an aperture slot, for example. Depending on the position of the element, the split-up spectrum is offset within the aperture plane, which is why, for each element, a different part of the spectrum may pass through the aperture. Due to the superposition of the spatially offset spectra of different elements, a spectrum thus forms again, behind the aperture, the composition of which depends on the control of the elements.

By controlling the individual filaments, the spectrum of the radiation generation device may be changed or modulated. Due to the size of the individual radiation emitting areas, a high level of temporal modulation may be achieved, which may also be used for a high level of temporal wavelength modulation. Depending on the wavelength range that may be used, it is also possible to structure organic light emitting diodes (OLEDs), light emitting diodes (LEDs), or similar emitters. In addition, it is possible to generate a mixture of light from different wavelength intervals by simultaneously controlling several filaments or, generally, several radiation elements.

For spectrally limiting the spectrum and for suppressing relatively high-order diffractions in the use of gratings, absorption or interference filters may be additionally integrated into the optical path. For controlling the light source, or as a current source or current supply, an electronic circuit 100, or a micro-electronic circuit, may be part of the overall system of the modulatable light source. It is also possible for radiation detectors to be integrated, which monitor the total performance or the spectral composition and may be used for closed-loop control.

The following applications shall be mentioned as examples of application: gas analysis ($CO_2$ measurement, CO measurement, sensors for fire detectors, checking of the fuel gas composition and monitoring of waste gas treatment), analysis of liquids (on-line water analysis, analysis of alcohol, and monitoring of fuel quality), analysis of solids (water content of foodstuffs, on-line checking of the main components of foodstuffs, sorting of plastics and monitoring of the compositions of pharmaceutical products), telecommunications (wavelength-modulated signal transmission), and measurement technology (on-line color check and calibration of photodetectors and detector arrays). Applications may therefore be found, for example, in environmental measurement technology, agriculture, production of foodstuffs, pharmaceutics, dermatology, medicine, biotechnology, chemistry, petrochemistry, recycling, automobile manufacture, aviation, and air-conditioning technology.

Embodiments of the present invention provide a radiation generation device that may emit light within a narrow, but freely selectable wavelength range, is tunable, particularly in the near-infrared to medium-infrared spectral ranges, may be manufactured in large batches, may be realized to be small-sized and light-weight, consumes little energy, and is sufficiently robust for mobile applications.

The high level of integration enables low-cost production in large numbers of pieces. In addition, embodiments of the radiation generation device have no movable parts, so that the radiation generation device is particularly robust and, additionally, easy to control electrically. Moreover, radiation generation devices may also be configured to be small-sized, light-weight and energy-efficient.

Embodiments enable optional access to the wavelength intervals, fast response, tailor-made spectra by means of corresponding selection from an m-of-n ensemble.

Embodiments of the radiation generation device comprise several means for thermal generation of electromagnetic radiation, so-called filaments, the filaments being spatially arranged such that they directly or indirectly illuminate a diffractive structure, for example a reflection grating. Due to the diffractive structure, the radiation is split up, in a solid angle dependent manner, into the various wavelengths. By means of at least one corresponding means, for example an exit slit, only a certain part of the wavelength range is coupled out. The location of the wavelength range may be controlled by the selection of filament.

Further embodiments of the radiation generation device comprise filaments that have, as their material, monocrystalline silicon, which is conductive due to sufficiently high doping levels. Alternatively, the filaments may be configured in metal thin layers or conductive ceramics. The filaments may be manufactured, for example, from so-called SOI substrates by etching. Depending on the selection of the configuration substrate, the filaments have thicknesses of several 100 nm to several μm. The exit slit, or the optical opening, may be realized within the same chip, and its position is precisely definable due to the high precision of micro-system technique technology. This chip may be mounted, by means of vacuum packaging technology, onto a pressed plastic body or substrate containing a holographic grating, for example with a blazed structure. In the other spatial direction, the system is also hermetically sealed, so that the filaments are entirely within a vacuum. Alternatively, a protective gas or an active gas may be employed, as with commercial halogen lamps. Embodiments of the radiation generation device comprise, e.g., 128 or 256 filaments per chip, which have widths of about 5 μm and lengths of about 250 μm. For compensating for the thermal expansion (a change in length of 6 μm with an Si filament of 250 μm at an operation of 1,200° C.), the embodiments may further comprise a holder that is specifically designed on one side and comprises a flexible element.

Yet another embodiment of the present invention provides a radiation generation device comprising several radiation elements for emitting electromagnetic radiation that may be controlled by generating a high temperature of the element, said radiation generation device further comprising a wavelength-selective element, which deflects, for each radiation element, a certain wavelength range to a certain solid-angle element, said radiation generation device further comprising an element for limiting a solid-angle range through which the electromagnetic radiation exits the radiation generation device, it being possible for the location of the wavelength interval to be influenced by the selection of the one or more emitting elements, and that a spectrum which has a measurable intensity only within a certain wavelength interval may exit the light source.

In other embodiments, the functional layer 61 and/or the non-transparent layer 30 may have, instead of a slit or a continuous recess, a transparent area within the functional layer 61 or the non-transparent layer 30 so as to form the optical opening 3.

Embodiments of the present invention may be configured such that the multitude of radiation elements, the dispersive optical element, and the optical opening are mutually mechanically secured, that is, they are unmovably arranged within the radiation generation device, i.e. none of the above-mentioned elements is displaceable or rotatable, for example.

Further embodiments provide a radiation generation device for generating electromagnetic radiation, said radiation generation device comprising several elements 1, or 1*a* to 1*n*, for generating electromagnetic radiation, and it being possible to control the elements independently of one another, wherein the radiation generation device comprises at least one dispersive optical element 2 for spectrally splitting up the radiation emanating from the elements, the radiation generation device comprising an optical device 3 for coupling out the electromagnetic radiation, the opening 3 being configured and arranged such that it limits the spectral bandwidth of the radiation emitted by each individual element 1*a* to 1*n* and split up by the dispersive element, and it being possible for the spectral composition of the radiation 220 passing through the optical opening to be influenced by controlling the radiation generating element(s) in a targeted manner.

Further developments of the embodiments provide, for example, a radiation generation device wherein the elements for generating the electromagnetic radiation are configured to be strip-shaped and are arranged in a regular manner or at variable distances from one another.

Further developments of the embodiments provide, e.g., a radiation generation device wherein the elements for generating the electromagnetic radiation have different geometries in each case.

Further developments of the embodiments provide, e.g., a radiation generation device wherein the elements for generating the electromagnetic radiation are formed from heatable structures, so-called filaments, or inorganic or organic light emitting diodes (LEDs, OLEDs), or laser diodes.

Further developments of the embodiments provide, e.g., a radiation generation device wherein the filaments consist of a metal or a metal alloy or an electrically conductive metal/non-metal compound or a semiconductor material such as silicon, or a conductive non-metal such as graphite-like carbon, or compounds of non-metals.

Further developments of the embodiments provide, e.g., a radiation generation device wherein the filaments consist of a (lateral) stack of different materials.

Further developments of the embodiments provide, e.g., a radiation generation device wherein the dispersive optical element is a diffraction grating or a prism or a combination of same.

Further developments of the embodiments provide, e.g., a radiation generation device wherein the optical opening for coupling out electromagnetic radiation is configured as an aperture having a rectangular or oval cross section, or is configured from a structure having a plurality of openings.

Further developments of the embodiments provide, e.g., a radiation generation device wherein the optical opening for coupling out electromagnetic radiation consists of a material that is transparent to the radiation and is partly coated with a material not transparent to the radiation, or a stack of layers.

Further developments of the embodiments provide, e.g., a radiation generation device wherein the optical opening for coupling out electromagnetic radiation are arranged on or in a shared substrate or a shared diaphragm or are arranged in a self-supporting manner, mechanically secured by a shared substrate.

Further developments of the embodiments provide, e.g., a radiation generation device wherein the dispersive optical element or the opening for coupling out the radiation is arranged in or on a substrate.

Further developments of the embodiments provide, e.g., a radiation generation device wherein the elements for generating the electromagnetic radiation and the dispersive optical element or the opening for coupling out the radiation, or both, are arranged on or in a shared substrate or a shared diaphragm.

Further developments of the embodiments provide, e.g., a radiation generation device wherein the dispersive element and the opening for coupling out the radiation are arranged on or in a shared substrate.

Further developments of the embodiments provide, e.g., a radiation generation device wherein the substrate having arranged the elements for generating electromagnetic radiation arranged thereon or therein is indirectly or directly connected to the substrate, which has the dispersive optical element arranged thereon or therein, or to the substrate which has the opening for coupling out the radiation arranged thereon or therein.

Further developments of the embodiments provide, e.g., a radiation generation device wherein the substrates are connected to one another in a stacked manner.

Further developments of the embodiments provide, e.g., a radiation generation device wherein there is a spacer substrate between the substrate having the elements for generating electromagnetic radiation arranged thereon or therein and the substrate having the dispersive optical element arranged thereon or therein, or the substrate having the opening for coupling out the radiation arranged thereon or therein.

Further developments of the embodiments provide, e.g., a radiation generation device wherein one of the substrates comprises further optical functional elements.

Further developments of the embodiments provide, e.g., a radiation generation device wherein the substrates are indirectly or directly connected to one another.

Further developments of the embodiments provide, e.g., a radiation generation device wherein the shared substrate of the elements for generating electromagnetic radiation is a silicon-on-insulator substrate (SOI) or a silicon substrate or a glass substrate or a ceramic substrate.

Further developments of the embodiments provide, e.g., a radiation generation device wherein the substrate having the dispersive element or the optical opening located thereon or therein comprises one of the material groups of glass, ceramics, plastic, metal, or a semiconductor material.

Further developments of the embodiments provide, e.g., a radiation generation device wherein at least one detector is present for measuring the power of electromagnetic radiation.

Further developments of the embodiments provide, e.g., a radiation generation device wherein at least one measuring means is present for detecting the spectral composition.

Further developments of the embodiments provide, e.g., a radiation generation device wherein the radiation emitted by the source is within the ultraviolet or visible or infrared spectral range, or a combination of same.

Further developments of the embodiments provide, e.g., a radiation generation device wherein the spectral composition of the radiation output by the source may be varied in time by sequentially controlling one or more radiation emitting elements.

Further developments of the embodiments provide, e.g., a radiation generation device wherein a mixture of electromagnetic radiation is generated in a targeted manner by simultaneously operating several radiation emitting elements.

Yet further developments may comprise reflection gratings or holographic gratings as dispersive optical elements, may comprise silicon monocrystal, doped semiconductor substrates, SOI substrates, high-melting metals, high-melting and conductive compounds such as TaC, HfC, TaHfC, which comprise thermal stress compensation, as filament materials, may comprise monitor diodes as radiation elements, may comprise electrical excitation, pulsed excitation or non-electrical excitation, may comprise gratings that have been manufactured in molding processes, are pressed or deep-drawn, may comprise gratings within the chip, and mirrors.

Embodiments of the present invention also provide a spectral analysis device having a radiation generation device as was described above, a radiation detector configured to receive the resulting electromagnetic radiation or electromagnetic radiation generated by means of the resulting electromagnetic radiation, and an evaluation unit configured to perform a spectral analysis on the basis of the electromagnetic radiation received.

Embodiments of the spectral analysis device may comprise only one single radiation detector that is arranged in a spatially unvariable manner in relation to the radiation generation device, or is configured to perform a spectral analysis without changing a position of the radiation detector or a spatial arrangement of the radiation generation device in relation to the radiation detector.

Embodiments of the present invention also provide a method of producing a radiation generation device, comprising the following steps.

Providing or generating a multitude of radiation elements configured to generate a radiation element specific electromagnetic radiation, respectively, upon being activated, a first radiation element of the multitude of radiation elements being activatable independently of other radiation elements of the multitude of radiation elements. Providing or generating an optical opening. Providing or generating a dispersive optical element. Connecting the dispersive optical element to the multitude of radiation elements and to the optical opening, the dispersive optical element being arranged and configured, in relation to the multitude of radiation elements and the optical opening, to deflect the radiation element specific electromagnetic radiations in dependence on their angles of incidence and their wavelengths such that a limited spectral range of each of the radiation element specific electromagnetic radiations may exit through the optical opening, so that the spectral composition of the resulting electromagnetic radiation exiting through the optical opening is adjustable by selectively activating the multitude of radiation elements.

Depending on the production technologies, the aforementioned steps may be performed in a different order and/or at least partially simultaneously. Embodiments of the manufacturing method of manufacturing a radiation generation device may be configured such that the step of generating the radiation elements, the dispersive element and/or the optical opening, the step of connecting the substrates and layers (e.g., of FIGS. 2a: 8, 61, 62 and 9), in or on which the radiation elements, the dispersive element and/or the optical opening may be arranged and hermetic encapsulation is performed both in a wafer bond arrangement and with singulated components. For further details of the various manufacturing technologies and steps, please refer to the above description.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A radiation generation device for generating resulting electromagnetic radiation comprising an adjustable spectral composition, comprising:
a multitude of radiation elements configured to generate a radiation element specific electromagnetic radiation, respectively, upon being activated, a first radiation element of the multitude of radiation elements being activatable independently of a second radiation element of the multitude of radiation elements;
a dispersive optical element; and
an optical opening;
the dispersive optical element being configured to deflect each radiation element specific electromagnetic radiation, in dependence on its wavelength and on a position of the radiation element generating the respective radiation element specific electromagnetic radiation, such that a particular spectral range of each of the radiation element specific electromagnetic radiations may exit through the optical opening, so that the spectral composition of the resulting electromagnetic radiation exiting through the optical opening is adjustable by selectively activating the multitude of radiation elements.

2. The radiation generation device as claimed in claim 1, comprising:
a controller configured to selectively activate individual or several radiation elements of the multitude of radiation elements so as to adjust the spectral composition of the resulting electromagnetic radiation.

3. The radiation generation device as claimed in claim 1, wherein the dispersive optical element is configured to split up each of the radiation element specific electromagnetic radiations into a multitude of spectral constituents, respectively, the dispersive optical element and the optical opening being arranged and configured such that one of the spectral constituents of each radiation element specific electromagnetic radiation may pass through the optical opening, so that the spectral composition of the resulting electromagnetic radiation passing through the optical opening is adjustable by selectively activating the multitude of radiation elements.

4. The radiation generation device as claimed in claim 1, wherein a first radiation element of the multitude of radiation elements is configured to generate a first radiation element specific electromagnetic radiation, and a second radiation element of the multitude of radiation elements is configured to generate a second radiation element specific electromagnetic radiation, a spectral range of the second radiation element specific electromagnetic radiation being identical with a spectral range of the first radiation element specific electromagnetic radiation, and the dispersive optical element being configured such that a first spectral constituent of the first radiation element specific electromagnetic radiation may exit through the optical opening and a first spectral constituent of the second radiation element specific electromagnetic radiation cannot exit through the optical opening, wherein the first spectral constituent of the first radiation element specific electromagnetic radiation and the first spectral constituent of the second radiation element specific electromagnetic radiation are identical.

5. The radiation generation device as claimed in claim 4, wherein the dispersive optical element is configured such that a first spectral constituent of the first radiation element specific electromagnetic radiation and a second spectral constituent of the second radiation element specific electromagnetic radiation can exit through the optical opening, the first spectral constituent of the first radiation element specific electromagnetic radiation being different from the second constituent of the second radiation element specific electromagnetic radiation.

6. The radiation generation device as claimed in claim 1, wherein the multitude of radiation elements comprises at least one thermal radiation element which comprises, as its material, a metal, a metal alloy, an electrically conductive metal/non-metal compound, a semiconductor material, a conductive non-metal, or compounds of non-metals.

7. The radiation generation device as claimed in claim 1, wherein the multitude of radiation elements comprises at least one thermal radiation element, and the thermal radiation element comprises a stack of layers comprising layers made of different materials.

8. The radiation generation device as claimed in claim 6, wherein a radiation element comprises a respective extension, perpendicular to a substrate plane, ranging from 100 nm to 100 µm, or, in a direction parallel to the substrate plane, an extension of 1 µm to 200 µm, or, in the direction perpendicular to the other direction parallel to the substrate plane, an extension of 10 µm to 10 mm.

9. The radiation generation device as claimed in claim 1, wherein the multitude of radiation elements comprise, as radiation elements, one or more organic or inorganic light emitting diodes (OLEDs, LEDs) or laser diodes.

10. The radiation generation device as claimed in claim 1, wherein the dispersive optical element is a diffraction grating, a concave diffraction grating, a prism, or a combination of same.

11. The radiation generation device as claimed in claim 1, comprising one or more further optical elements from the set of: lenses, mirrors, elements for reducing the scattered or stray light, or elements for additional spectral filtering.

12. The radiation generation device as claimed in claim 1, wherein the optical opening is configured as an aperture comprising a rectangular or oval cross section, or is configured from a structure comprising a multitude of openings.

13. The radiation generation device as claimed in claim 1, wherein the multitude of radiation elements, the dispersive optical element and the optical opening are unmovably arranged within the radiation generation device.

14. The radiation generation device as claimed in claim 1, wherein the optical opening comprises a material that is transparent to the resulting electromagnetic radiation and is partly coated with a material that is non-transparent to the resulting electromagnetic radiation, or with a stack of layers.

15. The radiation generation device as claimed in claim 1, wherein the radiation elements are arranged on or in a shared substrate or a shared diaphragm or are arranged in a self-supporting manner, mechanically secured by a shared substrate.

16. The radiation generation device as claimed in claim 1, wherein the dispersive optical element or the optical opening, or openings, are arranged in or on a substrate.

17. The radiation generation device as claimed in claim 1, wherein the dispersive optical element and the optical opening, or openings, are arranged on or in a shared substrate.

18. The radiation generation device as claimed in claim 1, wherein the radiation elements, the dispersive optical element or the optical opening or the dispersive element and the optical opening, or openings, are arranged on or in a shared substrate or a shared diaphragm.

19. The radiation generation device as claimed in claim 1, wherein the radiation elements are arranged on or in a substrate, the dispersive optical element is arranged on or in a substrate, and the optical opening is arranged on or in a substrate, and wherein the substrate which has the radiation elements arranged thereon or therein is indirectly or directly connected to the substrate which has the dispersive optical element arranged thereon or therein, or to the substrate which has the optical opening(s) arranged thereon or therein.

20. The radiation generation device as claimed in claim 19, wherein the substrates are connected to one another in a stacked manner.

21. The radiation generation device as claimed in claim 1, wherein the radiation elements are arranged in or on a silicon-on-insulator substrate.

22. The radiation generation device as claimed in claim 1, wherein the radiation elements are configured to be strip-shaped manner and are arranged in a regular manner or at variable distances from one another.

23. A spectral analysis device, comprising:
a radiation generation device for generating resulting electromagnetic radiation comprising an adjustable spectral composition, said radiation generation device comprising:
  a multitude of radiation elements configured to generate a radiation element specific electromagnetic radiation, respectively, upon being activated, a first radiation element of the multitude of radiation elements being activatable independently of a second radiation element of the multitude of radiation elements;
  a dispersive optical element; and
  an optical opening;
  the dispersive optical element being configured to deflect each radiation element specific electromagnetic radiation, in dependence on its wavelength and on a position of the radiation element generating the respective radiation element specific electromagnetic radiation, such that a particular spectral range of each of the radiation element specific electromagnetic radiations may exit through the optical opening, so that the spectral composition of the resulting electromagnetic radiation exiting through the optical opening is adjustable by selectively activating the multitude of radiation elements;
a radiation detector configured to receive the resulting electromagnetic radiation or an electromagnetic radiation generated by means of the resulting electromagnetic radiation; and
an evaluation unit configured to perform a spectral analysis on the basis of the received electromagnetic radiation.

24. A method of producing a radiation generation device, comprising:
providing or generating a multitude of radiation elements configured to generate a radiation element specific electromagnetic radiation, respectively, upon being activated, a first radiation element of the multitude of radiation elements being activatable independently of a second radiation element of the multitude of radiation elements;
providing or generating an optical opening;
providing or generating a dispersive optical element,
connecting the dispersive optical element to the multitude of radiation elements and to the optical opening, the dispersive optical element being arranged and configured, in relation to the multitude of radiation elements and the optical opening, to deflect the radiation element specific electromagnetic radiations in dependence on their wavelengths and on a position of the radiation element generating the respective radiation element specific electromagnetic radiation such that a limited spectral range of each of the radiation element specific electromagnetic radiations may exit through the optical opening, so that the spectral composition of the resulting electromagnetic radiation exiting through the optical opening is adjustable by selectively activating the multitude of radiation elements.

* * * * *